United States Patent
Hatano et al.

(10) Patent No.: US 12,063,072 B2
(45) Date of Patent: Aug. 13, 2024

(54) COMMUNICATION SYSTEM AND OLT SYSTEM

(71) Applicant: NIPPON TELEGRAPH AND TELEPHONE CORPORATION, Tokyo (JP)

(72) Inventors: Tomoya Hatano, Musashino (JP); Keita Takahashi, Musashino (JP); Naotaka Shibata, Musashino (JP); Hiroko Nomura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 51 days.

(21) Appl. No.: 17/802,126

(22) PCT Filed: Mar. 6, 2020

(86) PCT No.: PCT/JP2020/009730
§ 371 (c)(1),
(2) Date: Aug. 24, 2022

(87) PCT Pub. No.: WO2021/176696
PCT Pub. Date: Sep. 10, 2021

(65) Prior Publication Data
US 2023/0084976 A1    Mar. 16, 2023

(51) Int. Cl.
*H04B 10/03* (2013.01)
*H04B 10/275* (2013.01)

(52) U.S. Cl.
CPC ........... *H04B 10/275* (2013.01); *H04B 10/03* (2013.01)

(58) Field of Classification Search
None
See application file for complete search history.

(56) References Cited

U.S. PATENT DOCUMENTS

| | | | | |
|---|---|---|---|---|
| 8,145,054 | B2 * | 3/2012 | Ye | H04B 10/07955 398/19 |
| 8,428,456 | B2 * | 4/2013 | Zheng | H04J 14/0287 398/5 |
| 8,538,256 | B2 * | 9/2013 | Trojer | H04J 3/1694 398/58 |

(Continued)

FOREIGN PATENT DOCUMENTS

| | | |
|---|---|---|
| JP | 2001168802 A | 6/2001 |
| JP | 2009130505 A | 6/2009 |
| JP | 2013070123 A | 4/2013 |

OTHER PUBLICATIONS

Basic Technology Course GE-PON Technology, 1st What is PON?, NTT Technical Journal, vol. 17, No. 8, 2005, pp. 71-74, https://www.ntt.co.jp/journal/0508/files/jn200508071.pdf.

*Primary Examiner* — Jai M Lee
(74) *Attorney, Agent, or Firm* — Harness, Dickey & Pierce, P.L.C.

(57) ABSTRACT

A communication system of a passive optical communication network includes an optical line terminal (OLT) system including a first OLT, a second OLT, and an OLT control device that controls the first OLT and the second OLT, a plurality of splitters that connects between the first OLT and the second OLT with an optical communication path, and an optical network unit (ONU) that is connected to each of the plurality of splitters with an optical communication path.

19 Claims, 6 Drawing Sheets

(56) References Cited

U.S. PATENT DOCUMENTS

| | | | | |
|---|---|---|---|---|
| 8,724,453 B2* | 5/2014 | Sun | ............... | H04Q 11/0067 370/220 |
| 8,953,936 B2* | 2/2015 | Hood | ............... | H04J 14/0246 398/72 |
| 9,008,501 B2* | 4/2015 | Lutgen | ............... | H04B 10/032 398/4 |
| 9,130,676 B2* | 9/2015 | Mangin | ............... | H04B 10/27 |
| 9,167,323 B2* | 10/2015 | Zhang | ............... | H04Q 11/0067 |
| 9,319,758 B2* | 4/2016 | Goswami | ............... | H04Q 11/0067 |
| 11,936,432 B2* | 3/2024 | Hatano | ............... | H04B 10/272 |
| 2002/0071149 A1* | 6/2002 | Xu | ............... | H04B 10/032 370/216 |
| 2005/0019031 A1* | 1/2005 | Ye | ............... | H04B 10/077 398/19 |
| 2007/0140288 A1* | 6/2007 | Boyd | ............... | H04Q 11/0067 370/442 |
| 2009/0129770 A1 | 5/2009 | Oohashi et al. | | |
| 2010/0098407 A1* | 4/2010 | Goswami | ............... | H04B 10/272 398/1 |
| 2011/0188849 A1* | 8/2011 | Haramaty | ............... | H04J 14/00 398/43 |
| 2013/0071104 A1* | 3/2013 | Nakashima | ............... | H04J 14/0204 398/3 |
| 2014/0079396 A1* | 3/2014 | Hirano | ............... | H04J 14/0282 398/67 |
| 2014/0321845 A1* | 10/2014 | Jiang | ............... | H04L 67/12 398/5 |
| 2016/0134953 A1* | 5/2016 | Kramer | ............... | H04Q 11/0067 398/45 |

\* cited by examiner

COMMUNICATION SYSTEM AND OLT SYSTEM

CROSS-REFERENCE TO RELATED APPLICATIONS

This application is a 371 U.S. National Phase of International Application No. PCT/JP2020/009730, filed on Mar. 6, 2020. The entire disclosure of the above application is incorporated herein by reference.

TECHNICAL FIELD

The present disclosure relates to a communication system and an OLT system.

BACKGROUND ART

A service that provides optical access can be offered economically by using a passive optical communication network (PON) on which a terminal station device and a plurality of endpoint devices are connected (for example, see NPL 1). A PON is a point-to-multipoint network on which a station provides a service to multiple subscribers. For example, on a PON, a downlink optical signal from a station is split by an optical coupler linked to a single main fiber and distributed to multiple subscribers. An optical network unit (ONU) on the lower side and an optical line terminal (OLT) on the upper side are used on the PON.

CITATION LIST

Non Patent Literature

NPL 1: "Basic Technical Course GE-OPON Technology", [online], NTT Technical Journal, Aug. 2005, p. 71 to 74, [retrieved on Feb. 28, 2020], Internet URL: https://www.ntt.co.jp/journal/0508/files/jn200508071.pdf.

SUMMARY OF THE INVENTION

Technical Problem

However, PONs of the related art has difficulty to maintain communication when a failure such as a facility failure occurs.

In view of the above circumstance, it is an object of the present disclosure to provide a technology that enables to increase the likelihood of maintaining communication even when a failure occurs in a PON.

Means for Solving the Problem

An aspect of the present disclosure is a communication system of a passive optical communication network. The communication system includes an optical line terminal (OLT) system including a first OLT, a second OLT, and an OLT control device that controls the first OLT and the second OLT, a plurality of splitters that connect between the first OLT and the second OLT with an optical communication path, and an optical network unit (ONU) that is connected to each of the plurality of splitters with an optical communication path.

An aspect of the present disclosure is an optical line terminal (OLT) system of a passive optical communication network. The OLT system includes a first OLT, a second OLT, and an OLT control device that controls the first OLT and the second OLT. The first OLT and the second OLT are connected with a plurality of splitters and an optical communication path.

Effects of the Invention

The present disclosure makes it possible to increase the likelihood of maintaining communication even when a failure occurs in a PON.

DESCRIPTION OF EMBODIMENTS

Embodiments of the present disclosure will be described in detail with reference to the drawings.

Figure 1:
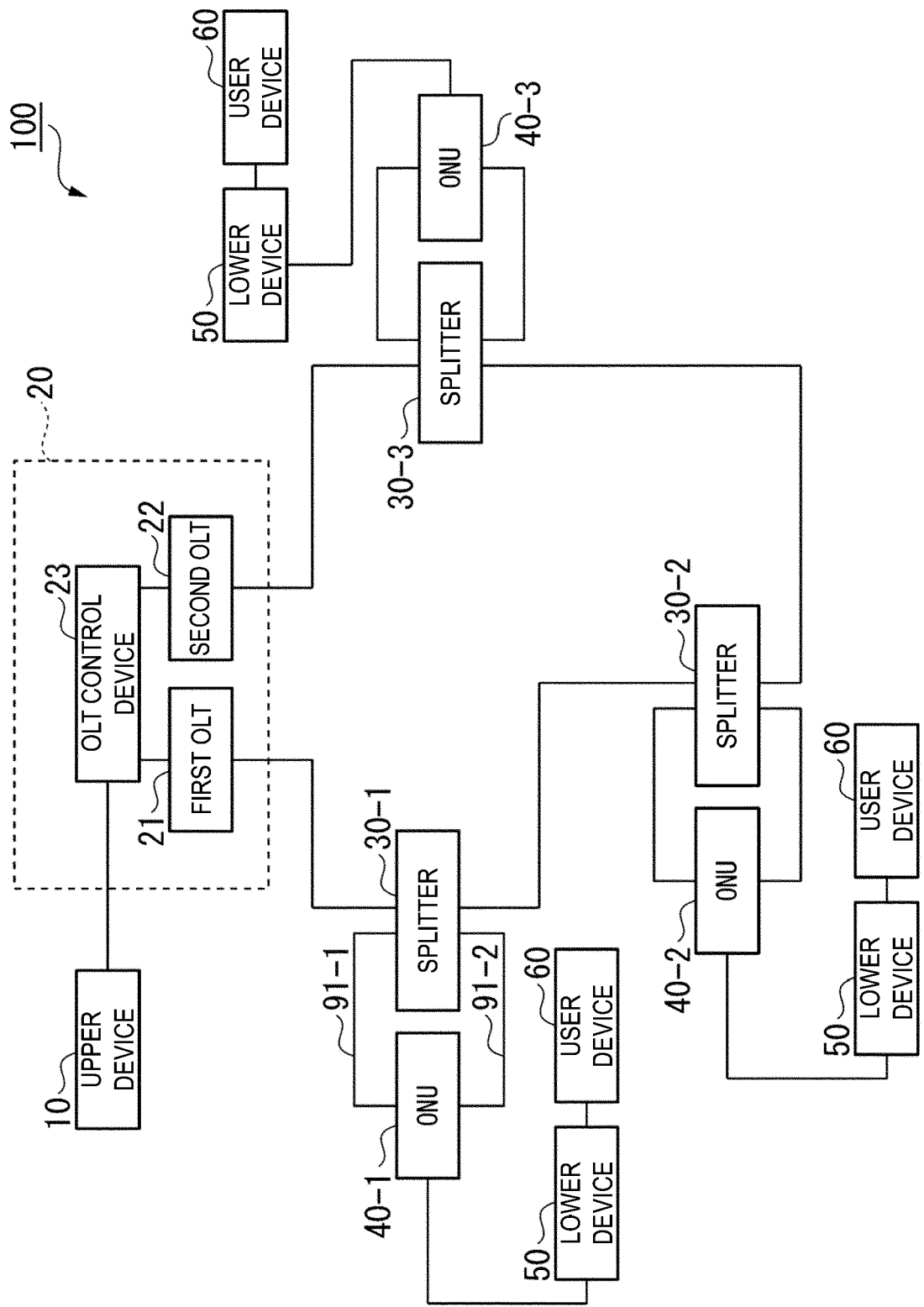
FIG. 1 is a diagram illustrating an exemplary system configuration of a communication system 100 according to the present disclosure.

FIG. 1 is a diagram illustrating an exemplary system configuration of a communication system 100 according to the present disclosure. The communication system 100 includes an upper device 10, an OLT system 20, a plurality of splitters 30, a plurality of ONUs 40, a lower device 50, and a user device 60. The upper device 10 is connected to an upper network of the communication system 100. Although three splitters 30 and three ONUs 40 are provided in FIG. 1, this number "three" is merely a specific example. That is, at least two splitters 30 and at least two ONUs 40 are required to be provided.

The OLT system 20 is provided so as to communicate with the upper device 10. The OLT system 20 functions as an OLT on a PON. The splitters 30 receive an input of optical signals and output an optical signal to a plurality of paths. The splitters 30 may be formed with, for example, two-input two-output optical splitters.

Each of the ONUs 40 is communicatively connected to the lower device 50. Each of the lower devices 50 is communicatively connected to one or a plurality of user devices 60. Each of the devices will be described in detail below. However, the upper device 10, the lower devices 50, and the user devices 60 will be described prior to describing the OLT system 20, the splitters 30, and the ONUs 40 for the sake of convenience in explanation.

The upper device 10 is communicatively connected to a plurality of lower devices 50 via the OLT system 20, the splitters 30, and the ONUs 40. The upper device 10 is a device that realizes a predetermined function by communicating with the plurality of lower devices 50. The upper device 10 is, for example, a base station apparatus (a base band unit or BBU) on a mobile network. The upper device 10 may be, for example, communication equipment constituting a relay network.

The lower devices 50 are devices that realize predetermined functions by communicating with the upper device 10. The lower devices 50 are devices that are provided at positions closer to the users than to the upper device 10. In a case in which the upper device 10 is a BBU, for example, the lower devices 50 are radio devices (remote radio heads: RRHs) on the mobile network. In this case, the communication path between the lower device 50 and the user device 60 is an access section on the mobile network. On the other hand, in a case in which the upper device 10 is communication equipment constituting a relay network, the lower devices 50 may be devices such as a set-top box. In this case, the communication path between the lower device 50 and the user device 60 may be a network such as a home network. Each lower device 50 accommodates one or a plurality of user devices 60, for example. Further, each user device 60 may be directly connected to the ONU 40 without the lower device 50.

The user devices 60 are devices connected to the lower devices 50 via communication paths to be communicatively connected to other devices. Each of the user devices 60 is an information processing device, for example, a smartphone, a tablet, or a personal computer. The user device 60 may be, for example, a sensor for the Internet of Things (IoT). The user device 60 may be a device for business applications, for example, an automatic teller machine (ATM), a vending machine, or a point-of-sale (POS) terminal.

Figure 2:
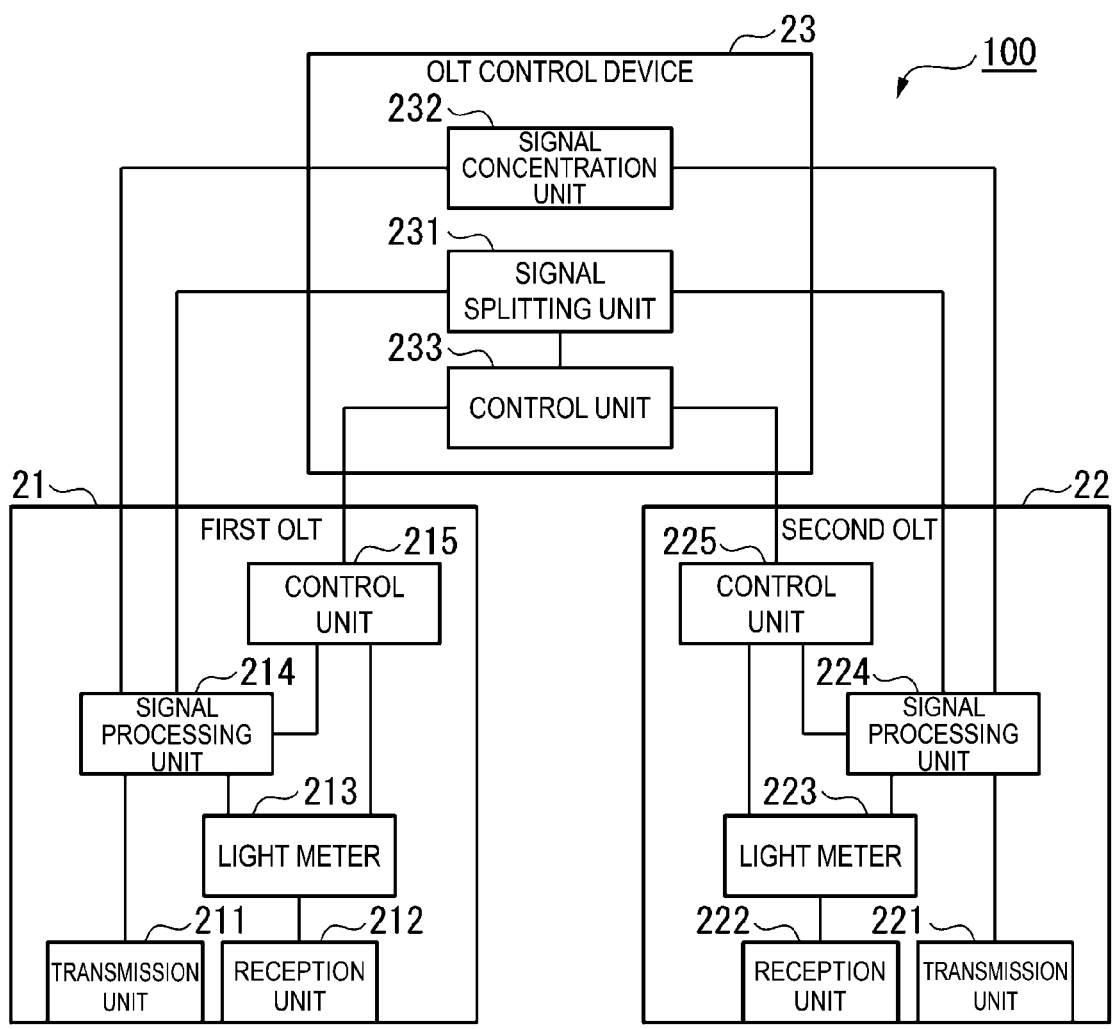
FIG. 2 is a diagram illustrating an exemplary configuration of an OLT system 20.

Next, the OLT system 20 will be described. FIG. 2 is a diagram illustrating an exemplary configuration of the OLT system 20. The OLT system 20 includes a first OLT 21, a second OLT 22, and an OLT control device 23. The first OLT 21 and the second OLT 22 are devices that each provide the OLT functions on the PON of the related art. That is, the OLT system 20 has at least two devices that provide the OLT functions. The first OLT 21 and the second OLT 22 may each be formed as a separate device having an individual housing or may be formed as a board or a chip. In any case, the first OLT 21 and the second OLT 22 are formed as software. Because the basic configurations of the first OLT 21 and the second OLT 22 are the same, the first OLT 21 will be described below as a representative.

The first OLT 21 includes a transmission unit 211, a reception unit 212, a light meter 213, a signal processing unit 214, and a control unit 215. The transmission unit 211 outputs an optical signal generated by the signal processing unit 214 to a communication path. The transmission unit 211 transmits an optical signal to the ONUs 40 via the splitters 30. Optical signals addressed to the plurality of ONUs 40 may be superimposed on the optical signal transmitted by the transmission unit 211.

The reception unit 212 receives an optical signal from a communication path and outputs the received optical signal to the light meter 213. The reception unit 212 receives optical signals from the ONUs 40 via the splitters 30. Optical signals transmitted from the plurality of ONUs 40 may be superimposed on the optical signals received by the reception unit 212.

The light meter 213 outputs information regarding the light intensity of the optical signal received by the reception unit 212. The light meter 213 may output a value representing, for example, the light intensity of the optical signal. The light meter 213 may output a binary value indicating whether the light intensity of the optical signal exceeds a predetermined threshold, for example. The light meter 213 may output any information as long as the information enables the control unit 215 to determine whether the reception unit 212 has received optical signals normally.

The signal processing unit 214 functions as an OLT of the related art. Exemplary processing of the signal processing unit 214 will be described below. The signal processing unit 214 converts an electrical signal transmitted from the upper device 10 to the lower devices 50 into an optical signal and outputs the converted signal to the transmission unit 211. The signal processing unit 214 may superimpose (multiplex) optical signals addressed to the plurality of lower devices 50. The signal processing unit 214 converts the optical signal received by the reception unit 212 into an electrical signal and outputs the electrical signal to the upper device 10 to be transmitted via the OLT control device 23.

The control unit 215 controls operations of the first OLT 21 following instructions from the OLT control device 23. When there is an instruction from a control unit 233 to perform an operation in a communication state, the control unit 215 controls the first OLT 21 such that the first OLT functions as an OLT on a normal PON. In addition, the control unit 215 outputs an output from the light meter 213 to the control unit 233. When the control unit 215 is instructed by the control unit 233 to operate in a standby state, the control unit 215 controls each of the functional units such that the first OLT 21 does not function as an OLT on the normal PON. In this case, the control unit 215 transmits the output from the light meter 213 to the control unit 233.

Some or all of operations of the control unit 215 may be implemented by software executed by, for example, a processor such as a CPU and a memory. Some or all of the control unit 215 may be implemented by hardware including an electronic circuit (or circuitry) in which, for example, a large scale integration circuit (LSI), an application specific integrated circuit (ASIC), a programmable logic device (PLD), a field programmable gate array (FPGA), or the like is used.

The transmission unit 211, the reception unit 212, the light meter 213, the signal processing unit 214, and the control unit 215 of the first OLT 21 each correspond to a transmission unit 221, a reception unit 222, a light meter 223, a signal processing unit 224, and a control unit 225 of the second OLT 22.

The OLT control device 23 includes a signal splitting unit 231, a signal concentration unit 232, and the control unit 233. The signal splitting unit 231 outputs a downlink signal output from the upper device 10 (a signal to be transmitted to the ONUs 40) to at least one of the first OLT 21 or the second OLT 22 following control of the control unit 233.

The signal concentration unit 232 outputs an uplink signal output from either the first OLT 21 or the second OLT 22 (a signal received from the ONUs 40) to the upper device 10.

The control unit 233 controls operations of the signal splitting unit 231 and operations of the first OLT 21 and the second OLT 22 based on a predetermined criterion. The predetermined criterion is a criterion for maintaining communication even if an equipment failure occurs in the communication system 100. Examples of operations of the control unit 233 include a first operation example and a second operation example.

In the first operation example, the control unit 233 controls each device differently in a normal communication state and in a failed communication state. The normal communication state is a state in which no particular communication problem has been detected in the communication system 100. In this case, the control unit 233 exerts control such that one of the first OLT 21 and the second OLT 22 is in a communication state and the other is in a standby state. In the normal communication state, the control unit 233 controls the signal splitting unit 231 so as to transmit an uplink signal output from an OLT in the normal state to the upper device 10. In addition, in the normal communication state, the control unit 233 controls the signal splitting unit 231 so as to output a signal transmitted from the upper device 10 to the OLT in the normal state.

The control unit 233 receives information regarding an output of a light meter from the OLT in the standby state to detect a communication problem in the communication system 100. For example, it is determined that a communication problem has occurred when the light intensity of an optical signal received by the OLT in the standby state is lower than a predetermined threshold. In this case, the control unit 233 operates in the failed communication state. In other words, the control unit 233 shifts the OLT, which has been in the standby state, to a communication state. Thereafter, both the first OLT 21 and the second OLT 22 of the OLT system 20 function as OLTs. During the failed communication, the signal processing unit 214 transfers uplink signals output from the OLTs (both OLTs) in the normal state to the signal concentration unit 232 to transmit to the upper device 10. In addition, during the failed communication, the control unit 233 controls the signal splitting unit 231 such that a signal transmitted from the upper device 10 is output to the OLTs (both OLTs) in the normal state.

In the second operation example, the control unit 233 controls both the first OLT 21 and the second OLT 22 in the communication state, regardless of whether the communication system 100 has a failure. For this reason, the signal processing unit 214 transfers uplink signals output from the OLTs (both OLTs) in the normal state to the signal concentration unit 232 to transmit to the upper device 10. In addition, the control unit 233 controls the signal splitting unit 231 to output a signal transmitted from the upper device 10 to the OLTs (both OLTs) in the normal state.

Figure 3:
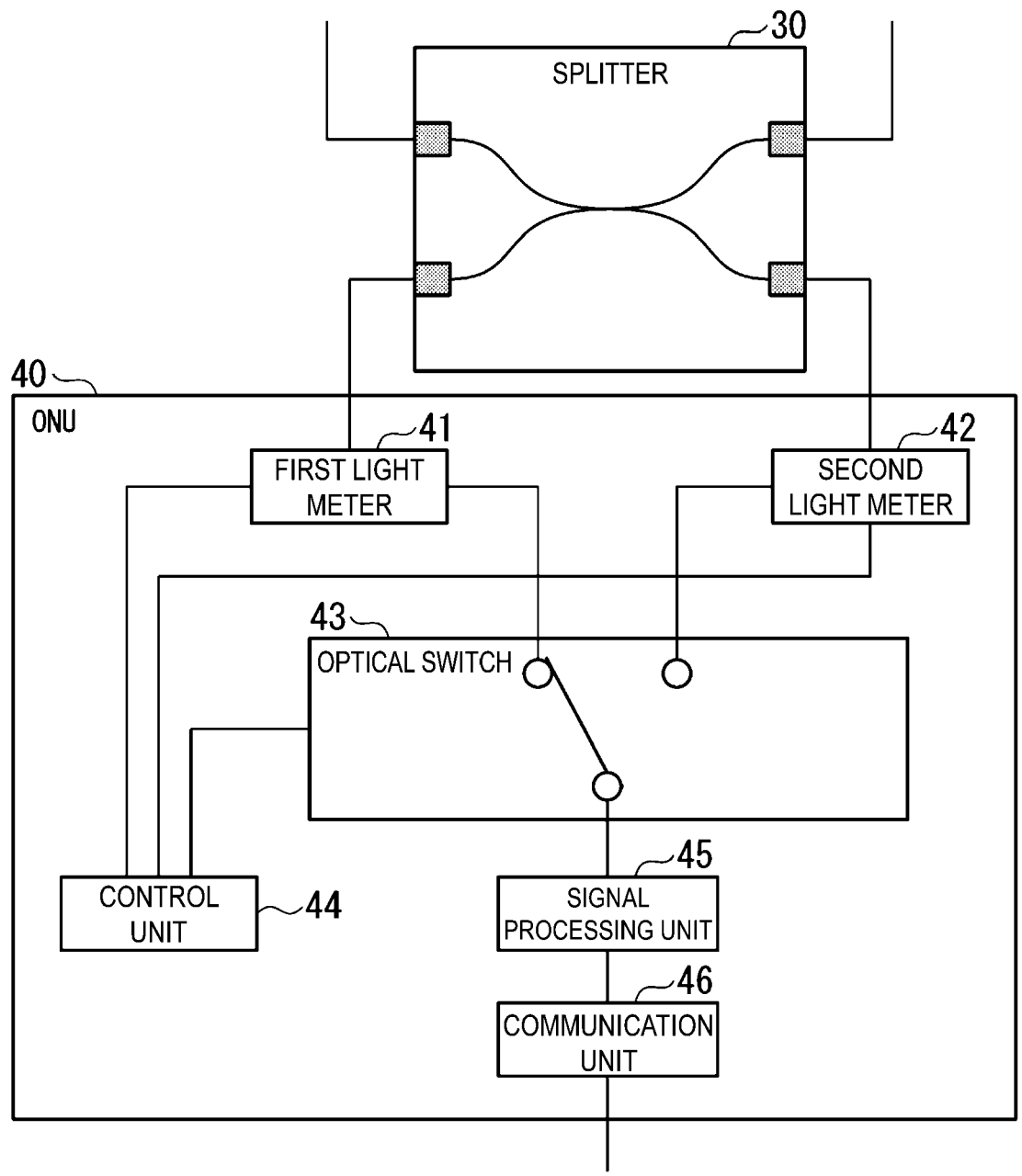
FIG. 3 is a diagram illustrating an exemplary configuration of a splitter 30 and an ONU 40.

FIG. 3 is a diagram illustrating an exemplary configuration of the splitter 30 and the ONU 40. The splitter 30 is configured with a two-input two-output splitter for optical signals. The splitter 30 distributes and outputs optical signals input from a communication path connecting the OLT system 20 formed in a ring shape and each splitter 30 (hereinafter referred to as a "main communication path") to a succeeding device and the ONU 40 connected to the splitter 30. The distribution ratio at this time may be an equal ratio (50:50) or an unequal ratio (for example, 40:60).

The succeeding device is a device different from a device from which the optical signal input to a reference device is output, out of two devices connected to the reference device via the main communication path. For example, if a splitter 30-1 is set as a reference splitter in FIG. 1, the succeeding device is a splitter 30-2 when an optical signal input from the OLT system 20 is distributed. For example, if a splitter 30-2 is set as a reference splitter in FIG. 1, the succeeding device is a splitter 30-3 when an optical signal input from the splitter 30-1 is distributed. For example, if a splitter 30-2 is set as a reference splitter in FIG. 1, the succeeding device is a splitter 30-1 when an optical signal input from the splitter 30-3 is distributed.

In addition, the splitter 30 outputs an optical signal to be output to the ONU 40 that is connected to the splitter 30 to the ONU 40 on a different communication path according to an input port. For example, the splitter 30 outputs the optical signal coming from the upper left of FIG. 3 to the upper right and lower right. Thus, taking the splitter 30-1 of FIG. 1 as an example, an optical signal coming from the first OLT 21 is output to a path 91-2 and the splitter 30-2. The optical signal output to the path 91-2 is input to the ONU 40-1. In addition, for example, the splitter 30 outputs an optical signal coming from the upper right of FIG. 3 to the upper left and lower left. Thus, taking the splitter 30-1 of FIG. 1 as an example, an optical signal coming from the splitter 30-2 is output to a path 91-1 and the first OLT 21. The optical signal output to the path 91-1 is input to the ONU 40-1. Further, the path 91-1 and the path 91-2 are each connected to different light meters. For example, the path 91-1 is connected to a first light meter 41 and the path 91-2 is connected to a second light meter 42.

The ONU 40 includes the first light meter 41, the second light meter 42, an optical switch 43, a control unit 44, a signal processing unit 45, and a communication unit 46. The first light meter 41 receives an optical signal output from the splitter 30. The first light meter 41 outputs information indicating the light intensity of the received optical signal to the control unit 44. The first light meter 41 outputs the received optical signal to the optical switch 43. The second light meter 42 receives an optical signal output from the splitter 30. The second light meter 42 outputs information indicating the light intensity of the received optical signal to the control unit 44. The second light meter 42 outputs the received optical signal to the optical switch 43.

The optical switch 43 outputs either an optical signal output from the first light meter 41 or an optical signal output from the second light meter 42 to the signal processing unit 45 according to control of the control unit 44. The optical switch 43 outputs an optical signal output from the signal processing unit 45 to the splitter 30 via either the first light meter 41 or the second light meter 42 according to control of the control unit 44.

The control unit 44 receives information regarding light intensity from each of the first light meter 41 and the second light meter 42, and selects the optical signal of the information from either the first light meter 41 or the second light meter 42 according to a predetermined criterion. The control unit 44 controls the optical switch 43 so that the selected optical signal is output to the signal processing unit 45. Highly reliable optical signal is selected in accordance with the predetermined criterion. The level of reliability may be determined based on the light intensity of the optical signal. For example, the control unit 44 may select an optical signal having a higher light intensity.

The control unit 44 determines the OLT to which the ONU 40 is assigned. The control unit 44 may determine, for example, the OLT (the first OLT 21 or the second OLT 22) to which the ONU 40 is assigned according to the selected light meter (the first light meter 41 or the second light meter 42). For example, when the first light meter 41 is selected, it may be determined that the ONU 40 is assigned to the first OLT 21. When the received optical signal contains transmission source information (information indicating the OLT serving as the transmission source), the control unit 44 may determine the OLT to which the ONU 40 is assigned, in accordance with the transmission source information. The control unit 44 notifies the OLT system 20 of the information indicating the OLT to which the ONU 40 is assigned. Some or all of the operations of the control unit 44 may be implemented by hardware including an electronic circuit using an LSI, an ASIC, a PLD, or an FPGA, for example.

The signal processing unit 45 functions as an ONU on the PON of the related art. Hereinafter, exemplary processing of the signal processing unit 45 will be described. The signal processing unit 45 converts an optical signal indicating a signal transmitted from the upper device 10 to the lower device 50 into an electrical signal and outputs the converted signal to the communication unit 46. At this time, if optical signals addressed to a plurality of lower devices 50 are superimposed (multiplexed), an optical signal addressed to the lower device 50 connected to the ONU 40 is taken out from the optical signals and then converted into an electrical signal. The signal processing unit 45 converts an electrical signal received by the communication unit 46 into an optical signal and outputs the converted signal to the optical switch 43.

The communication unit 46 is a communication interface that enables communication with the lower device 50.

Figure 4:
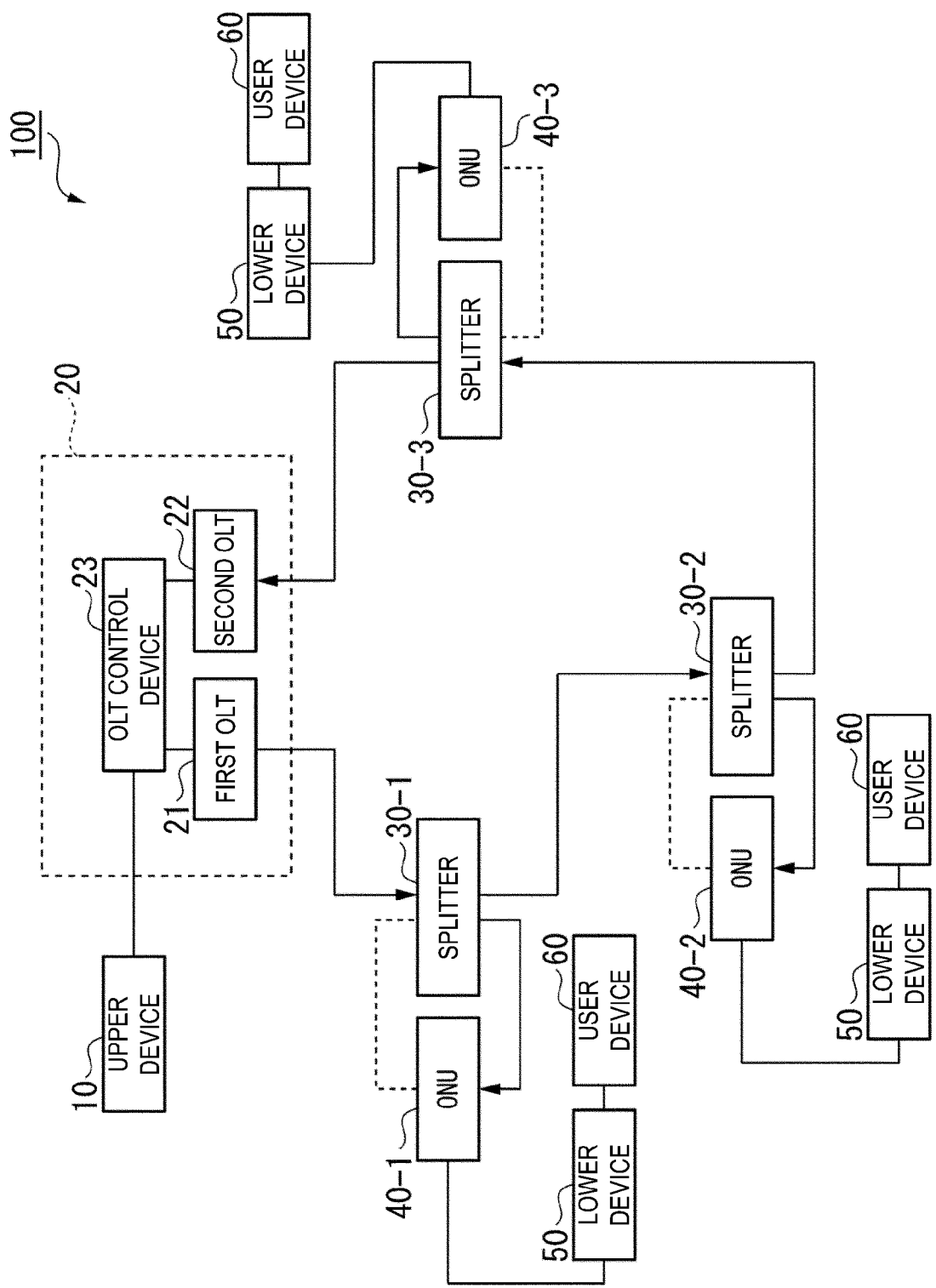
FIG. 4 is a diagram illustrating a specific exemplary operation of the communication system 100 during normal communication in a first operation example.

FIG. 4 is a diagram illustrating a specific exemplary operation of the communication system 100 during normal communication in the first operation example. The arrows shown in FIG. 4 represent the flow of a downlink signal (a signal flowing from the upper device 10 to the lower device 50). In the example of FIG. 4, the first OLT 21 is controlled to be in a communication state, and the second OLT 22 is controlled to be in a standby state. With the control, the downlink signal is transmitted in the counterclockwise direction in the communication system 100 in FIG. 4. The control is performed from when the communication system 100 is activated or when the OLT system 20 is activated. When receiving an instruction to operate in a normal state, the first OLT 21 activates equipment needed to function as an OLT, such as the signal processing unit 214, and operates as an OLT on the normal PON. The first OLT 21 is assigned to each ONU 40.

In FIG. 4, the communication paths indicated by the dashed lines of the two communication paths extending from the splitters 30 to the ONUs 40 indicate communication paths through which no optical signals transmitted from the OLT system 20 passes. The solid-line arrows indicate communication paths through which optical signals transmitted from the OLT system 20 pass.

In the example of FIG. 4, no particular failure has occurred in the communication system 100. Thus, the second OLT 22 receives an optical signal output from the splitter 30-3. As a result, the control unit 233 of the OLT control device 23 of the OLT system 20 determines that no failure has occurred.

Figure 5:
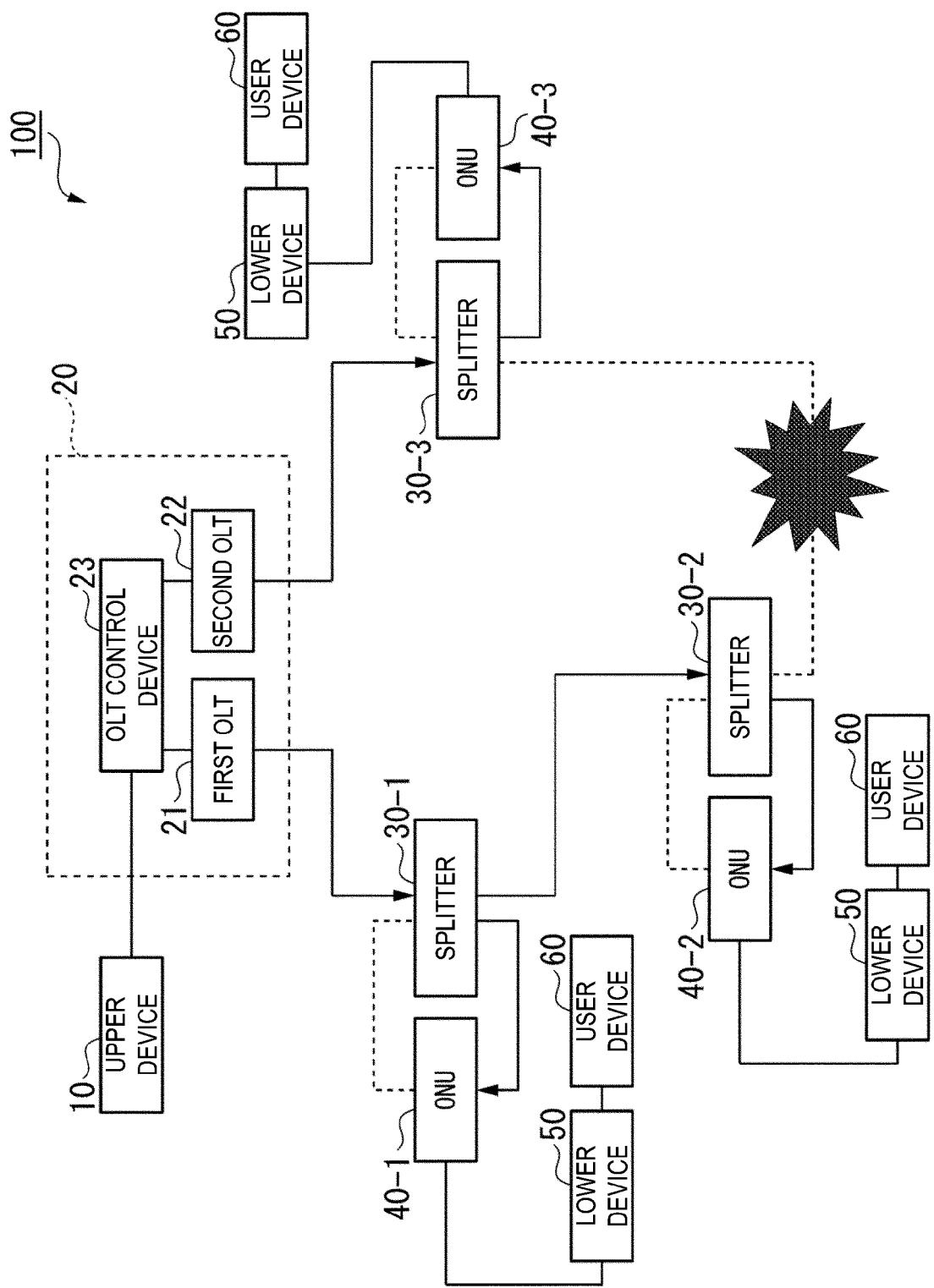
FIG. 5 is a diagram illustrating a specific exemplary operation of the communication system 100 during failed communication in the first operation example.

FIG. 5 is a diagram illustrating a specific exemplary operation of the communication system 100 during failed communication in the first operation example. The arrows shown in FIG. 5 represent the flow of a downlink signal (a signal flowing from the upper device 10 to the lower device 50). In the example of FIG. 5, the communication path between the splitter 30-2 and the splitter 30-3 has a failure. For this reason, the downlink signal output from the splitter 30-2 fails to reach the splitter 30-3. The second OLT 22 does not receive the optical signal output from the splitter 30-3. As a result, the control unit 233 of the OLT control device 23 of the OLT system 20 determines that a failure has occurred.

The control unit 233 performs control such that the second OLT 22 transitions to the normal state based on the determination. As a result, the second OLT 22 also outputs an optical signal equivalent to the optical signal output by the first OLT 21 to the communication path. Although the splitter 30-3 is not able to receive the optical signal output from the first OLT 21 due to the occurrence of the failure, the splitter can receive the optical signal output from the second OLT 22. The ONU 40-3 receives the optical signal transmitted from the second OLT 22 via the splitter 30-3. As a result, the ONU 40-3 changes the assigned OLT from the first OLT 21 to the second OLT 22.

With the operation described above, all of the ONUs (the ONU 40-1, the ONU 40-2, and the ONU 40-3) can receive the downlink signal from the OLT system 20 and maintain communication regardless of the occurrence of a failure.

Further, although the flow of the downlink signal in the first operation example has been described, an uplink signal is transmitted from each ONU 40 to the OLT system 20 when the signal flows in the opposite direction of the arrows through the paths indicated by the solid lines in each drawing.

Figure 6:
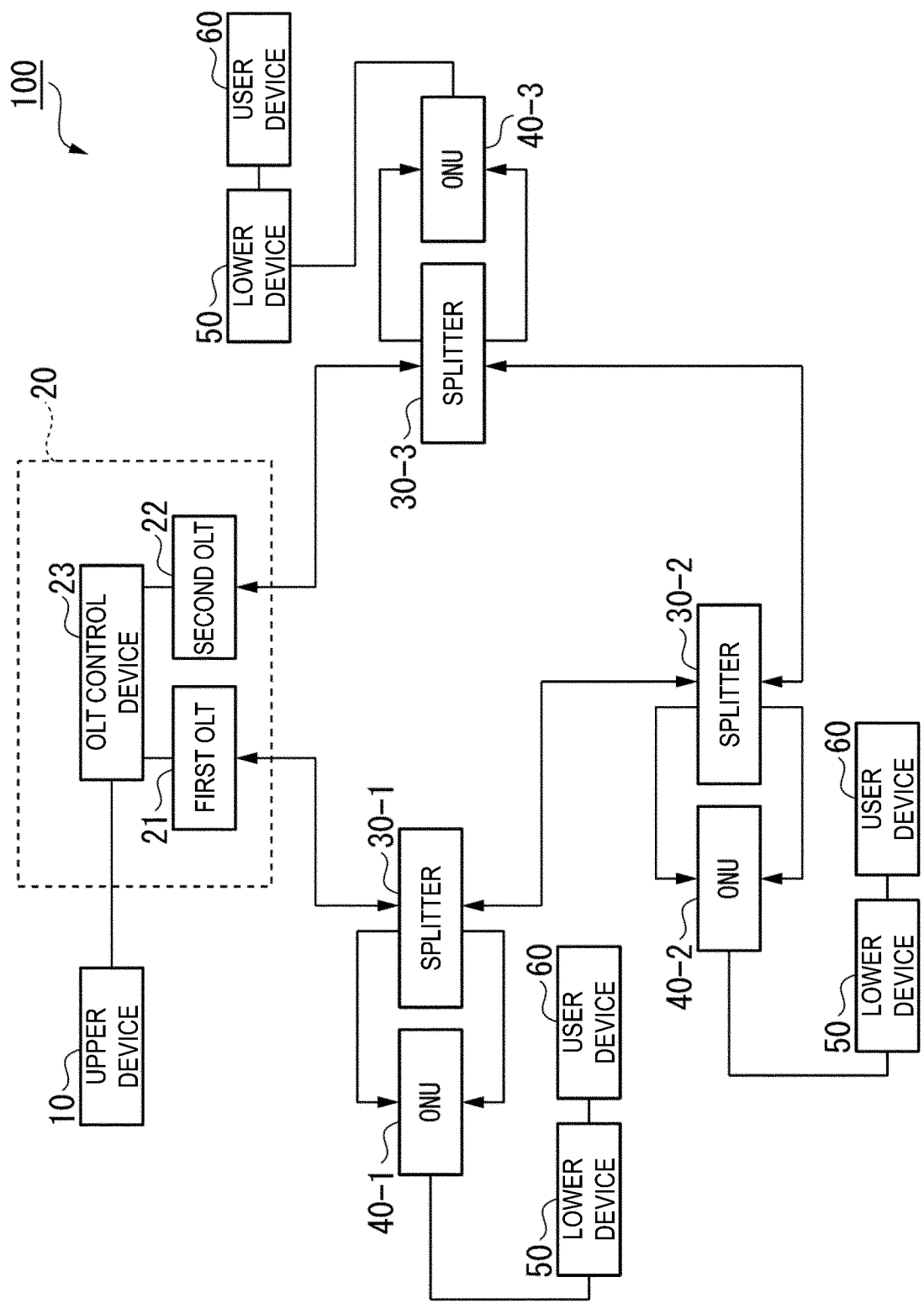
FIG. 6 is a diagram illustrating a specific exemplary operation of the communication system 100 during normal communication in a second operation example.

FIG. 6 is a diagram illustrating a specific exemplary operation of the communication system 100 during normal communication in the second operation example. The arrows shown in 6 represent the flow of a downlink signal (a signal flowing from the upper device 10 to the lower device 50). In the example of FIG. 6, both the first OLT 21 and the second OLT are controlled to be in a communication state.

With the control, the downlink signal is transmitted on both paths in the clockwise and counterclockwise directions in the communication system 100 in FIG. 6. The control is performed from when the communication system 100 is activated or when the OLT system 20 is activated. When receiving an instruction to operate in a normal state, the first OLT 21 and the second OLT 22 activate equipment needed to function as OLTs, such as the signal processing unit 214 and the signal processing unit 224, and operates as OLTs on the normal PON. Either the first OLT 21 or the second OLT 22 is assigned to each ONU 40.

In the example of FIG. 6, optical signals are transmitted from both the first OLT 21 and the second OLT 22, and any one of the optical signals is selected and used for processing in accordance with a predetermined criterion (for example, the signal with a higher light intensity) at each ONU 40. Thus, even if a failure occurs in the middle of a path as illustrated in FIG. 5, for example, all of the ONUs (ONU 40-1, ONU 40-2, and ONU 40-3) can receive the downlink signal from the OLT system 20 and maintain communication without particularly controlling the OLT system 20 for the failure.

Further, although the flow of the downlink signals is described in the second operation example, uplink signals are also transmitted to the OLT system 20 on the same path. Further, in FIG. 6, although the arrows between the splitters 30 and the ONUs 40 are directed in one direction, these arrows indicate the direction of the downlink signal. In the case of the uplink signal, the signal is transmitted using a path selected by the optical switch 43.

In the communication system 100 configured as described above, the OLT system 20 has functions of a plurality (for example, two) of OLTs. Even if a failure occurs in a communication path or the like, the likelihood that each ONU 40 receives an optical signal from at least one OLT increases. For this reason, the likelihood that communication can be maintained even when a failure occurs in the PON can increase.

Modified Example

In the OLT system 20, the OLT control device may be configured as a functional unit in a device of either or both of the first OLT 21 and the second OLT 22.

Although the embodiments of the present disclosure have been described in detail with reference to the drawings, a specific configuration is not limited to the embodiments, and a design or the like in a range that does not depart from the gist of the present disclosure is included.

INDUSTRIAL APPLICABILITY

The present disclosure can be applied to a communication system using a PON.

REFERENCE SIGNS LIST

100 Communication system
10 Upper device
20 OLT system
21 First OLT
22 Second OLT
23 OLT control device
30 Splitter
40 ONU
50 Lower device
60 User device
211 Transmission unit
212 Reception unit
213 Light meter
214 Signal processing unit
215 Control unit
221 Transmission unit
222 Reception unit
223 Light meter
224 Signal processing unit
225 Control unit
231 Signal splitting unit
232 Signal concentration unit
233 Control unit
41 First light meter
42 Second light meter
43 Optical switch
44 Control unit
45 Signal processing unit
46 Communication unit

The invention claimed is:

1. A communication system of a passive optical communication network, the communication system comprising:
an optical line terminal (OLT) system including a first OLT, a second OLT, and an OLT control device configured to control the first OLT and the second OLT;
a plurality of splitters configured to connect between the first OLT and the second OLT with an optical communication path, both ends of the optical communication path being connected to the first OLT and the second OLT, respectively; and
an optical network unit (ONU) connected to a splitter of the plurality of splitters with an optical communication path, the ONU having a first light meter, a second light meter, and an ONU controller,
wherein during normal communication where no failure is detected in the passive optical communication network including the OLT system, the plurality of splitters, and the ONU, the OLT control device is configured to cause the first OLT and the second OLT to transmit first and second downlink optical signals toward the ONU, respectively,
the first light meter is configured to receive the first downlink optical signal via the splitter to output first light intensity information corresponding to an intensity of the first downlink optical signal to the ONU controller,
the second light meter is configured to receive the second downlink optical signal via the splitter to output second light intensity information corresponding to an intensity of the second downlink optical signal to the ONU controller, and
the ONU controller is configured to:
determine which one of the first and second light intensity information has a higher intensity value;
pass a selected downlink optical signal among the first and second downlink optical signals to an external device, wherein the selected downlink optical signal has the higher intensity value; and
notify the OLT system about assignment information indicating one of the first and second OLTs to which the ONU is assigned, wherein the one of the first and second OLTs transmits the selected downlink optical signal having the higher intensity value.

2. The communication system according to claim 1, wherein the splitter of the plurality of splitters distributes and outputs, to the ONU connected to the splitter and another splitter or the OLT system, the first and second downlink optical signals transmitted from the OLT system.

3. The communication system according to claim 2, wherein the splitter of the plurality of splitters outputs the first and second downlink optical signals to the ONU through two paths, and
among the first and second downlink optical signals received from the two paths, the ONU controller selects the selected downlink optical signal and performs processing on the selected downlink optical signal.

4. The communication system according to claim 3, wherein the first downlink optical signal has first source information indicating a state in which the first downlink optical signal is transmitted from the first OLT,
the second downlink optical signal has second source information indicating a state in which the second downlink optical signal is transmitted from the second OLT, and
the ONU controller determines the one of the first and second OLTs to which the ONU is assigned based on the first and second source information.

5. The communication system according to claim 2, wherein the first downlink optical signal has first source information indicating a state in which the first downlink optical signal is transmitted from the first OLT,
the second downlink optical signal has second source information indicating a state in which the second downlink optical signal is transmitted from the second OLT, and
the ONU controller determines the one of the first and second OLTs to which the ONU is assigned based on the first and second source information.

6. The communication system according to claim 2, wherein the ONU is configured with a plurality of ONUs,
the plurality of ONUs are connected to the OLT system via the plurality of splitters, respectively, and
each of the plurality of ONUs is assigned to one of the first and second OLTs.

7. The communication system according to claim 2, wherein the OLT control device is configured to cause the first OLT and the second OLT to transmit the first and second downlink optical signals toward the ONU, respectively, when the communication system is activated or when the OLT system is activated.

8. The communication system according to claim 1, wherein the splitter of the plurality of splitters outputs the first and second downlink optical signals to the ONU through two paths, and among the first and second downlink optical signals received from the two paths, the ONU controller selects the selected downlink optical signal and performs processing on the selected downlink optical signal.

9. The communication system according to claim 8, wherein the first downlink optical signal has first source information indicating a state in which the first downlink optical signal is transmitted from the first OLT, the second downlink optical signal has second source information indicating a state in which the second downlink optical signal is transmitted from the second OLT, and
the ONU controller determines the one of the first and second OLTs to which the ONU is assigned based on the first and second source information.

10. The communication system according to claim 8, wherein the ONU is configured with a plurality of ONUs, the plurality of ONUs are connected to the OLT system via the plurality of splitters, respectively, and each of the plurality of ONUs is assigned to one of the first and second OLTs.

11. The communication system according to claim 8, wherein the OLT control device is configured to cause the first OLT and the second OLT to transmit the first and second downlink optical signals toward the ONU, respectively, when the communication system is activated or when the OLT system is activated.

12. The communication system according to claim 1, wherein the OLT control device is configured to cause the first OLT and the second OLT to transmit the first and second downlink optical signals, respectively, addressed to the ONU.

13. The communication system according to claim 12, wherein the first downlink optical signal has first source information indicating a state in which the first downlink optical signal is transmitted from the first OLT, the second downlink optical signal has second source information indicating a state in which the second downlink optical signal is transmitted from the second OLT, and
the ONU controller determines the one of the first and second OLTs to which the ONU is assigned based on the first and second source information.

14. The communication system according to claim 1, wherein the first downlink optical signal has first source information indicating a state in which the first downlink optical signal is transmitted from the first OLT, the second downlink optical signal has second source information indicating a state in which the second downlink optical signal is transmitted from the second OLT, and
the ONU controller determines the one of the first and second OLTs to which the ONU is assigned based on the first and second source information.

15. The communication system according to claim 14, wherein the ONU is configured with a plurality of ONUs, the plurality of ONUs are connected to the OLT system via the plurality of splitters, respectively, and each of the plurality of ONUs is assigned to one of the first and second OLTs.

16. The communication system according to claim 14, wherein the OLT control device is configured to cause the first OLT and the second OLT to transmit the first and second downlink optical signals toward the ONU, respectively, when the communication system is activated or when the OLT system is activated.

17. The communication system according to claim 1, wherein the ONU is configured with a plurality of ONUs, the plurality of ONUs are connected to the OLT system via the plurality of splitters, respectively, and each of the plurality of ONUs is assigned to one of the first and second OLTs.

18. The communication system according to claim 17, wherein the OLT control device is configured to cause the first OLT and the second OLT to transmit the first and second downlink optical signals toward the ONU, respectively, when the communication system is activated or when the OLT system is activated.

19. The communication system according to claim 1, wherein the OLT control device is configured to cause the first OLT and the second OLT to transmit the first and second downlink optical signals toward the ONU, respectively, when the communication system is activated or when the OLT system is activated.

* * * * *